July 3, 1973 W. C. MERZ ET AL 3,743,545
FLUID DISCHARGE DEVICE WITH DEFORMABLE LANCE
Filed July 16, 1970
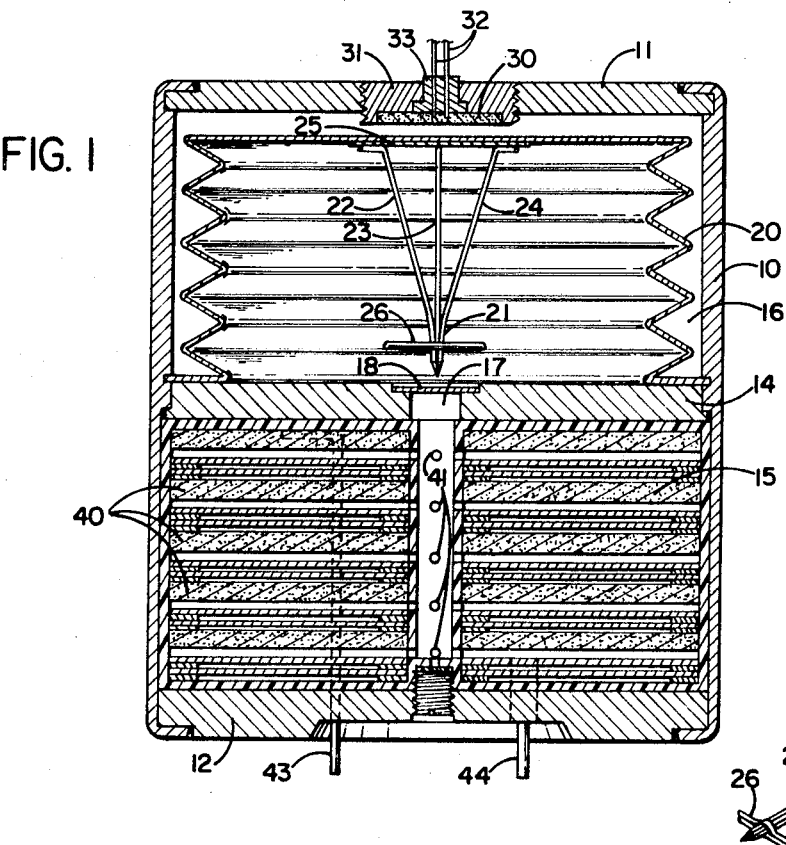
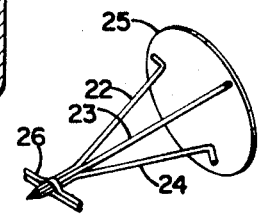
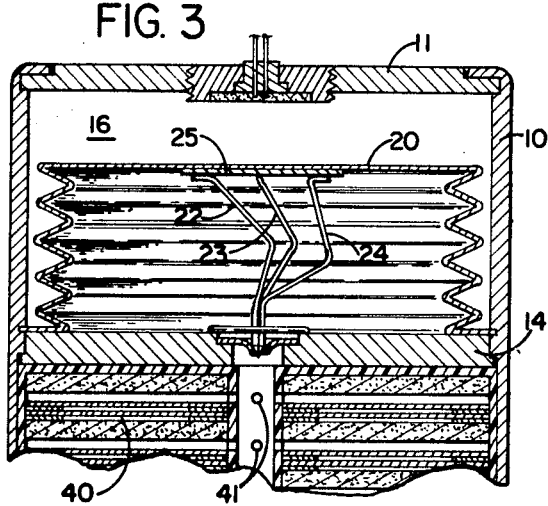
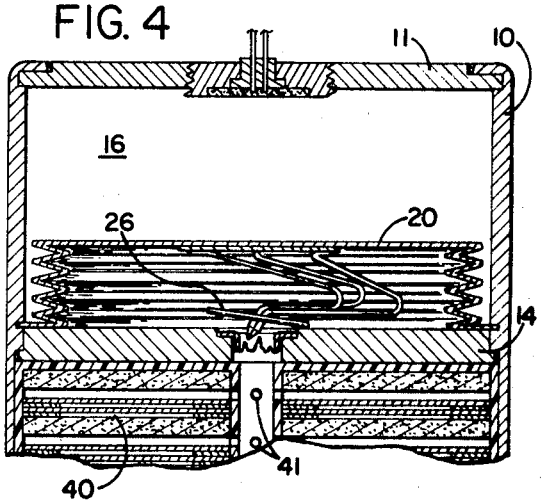
INVENTORS
WILLIAM C. MERZ
GEORGE J. METHLIE
ROLF W. SATTLER
OLEG S. SAVINOV
BY *Albin Medwey*
ATTORNEY

United States Patent Office 3,743,545
Patented July 3, 1973

---

3,743,545
FLUID DISCHARGE DEVICE WITH DEFORMABLE LANCE
William C. Merz, Aldan, George J. Methlie, Centre Square, Rolf W. Sattler, Norristown, and Oleg S. Savinov, North Wales, Pa., assignors to Honeywell Inc., Minneapolis, Minn.
Filed July 16, 1970, Ser. 55,518
Int. Cl. H01m 21/10
U.S. Cl. 136—114
4 Claims

ABSTRACT OF THE DISCLOSURE

An improved activator mechanism for a reserve electrochemical battery. The battery is comprised of an activator section and a battery compartment separated from the activator section by a pierceable membrane. To activate the battery, the membrane, separating the two compartments, is pierced by a lance, allowing a liquid to flow from the activator section into the battery compartment. The lance is constructed of deformable materials so that upon piercing the diaphragm, the lance is bent and is prevented from further penetration into the battery compartment.

BACKGROUND OF THE INVENTION

Field of the invention

A deferred-action type of primary battery wherein prior to activation the action of the battery is prevented by a pierceable diaphragm separating the battery cells from the electrolyte or the electrolyte solvent.

Description of the prior art

A substantial number of prior art patents show deferred-action type batteries, wherein activation is achieved by breaking a seal which separates the electrolyte from the electrodes. Representative of prior art are Pats. 3,239,385 and 3,298,868. Each of the above patents shows a lance-type initiating mechanism for a reserve battery. The lance is mounted within a collapsible cup, which prior to activation is filled with a liquid. The lance is mounted in such a way that, upon compression of the cup, it is forced through the diaphragm which is located in a position to close a passage between the cup and the battery compartment. To activate the battery, the diaphragm is pierced by the lance and upon further compression of the cup the lance is forced into a central column in the battery compartment. To prevent the lance from completely blocking the passage, the lance is provided with spiral grooves in the nature of a drill. Nonetheless, since the lance remains in the port between the liquid reservoir and the cell stack it restricts or impedes the liquid flow to the cells. This results in a time delay in the activation of the battery. Another disadvantage of such prior art arrangement is that the lance remains in the battery section after the activation. The presence of the lance in the battery compartment provides a conductive path which results in increased intercell leakage.

SUMMARY OF THE INVENTION

The invention described herein will find use primarily in the type of systems where a liquid is separated from other elements until application of an outside signal. In particular, the present invention will find use in a reserve activated battery in which the liquid is separated from the battery cells until it becomes desirable to activate the battery. The term "battery" as used in this specification may mean either a single current-producing cell or a plurality of current-producing cells arranged in series or in parallel, as the requirements of a particular situation may dictate. Separate compartments are provided for the electrolyte and the battery cells. The electrolyte compartment may be simply a portion of the battery case which is separated from the rest of the case by a pierceable diaphragm. To activate the battery, the diaphragm is pierced by means of a lance, which is forced through the diaphragm upon application of a signal.

In the preferred embodiment of the present invention, a compressible cup is mounted within the electrolyte compartment. The cup is mounted with the open end facing the aperture closed by the pierceable diaphragm. The lance for piercing the diaphragm is mounted within the cup so that upon compression of the cup the lance is forced through the diaphragm. The lance is equipped with a cross-member at a point near its tip. The length of the cross-member exceeds the diameter of the aperture connecting the battery compartment and the activator compartment, and thereby prevents the penetration of the lance into the battery compartment beyond that point. The lance is sufficiently rigid to pierce the membrane before bending, and sufficiently deformable to bend after the cross-member prevents further forward movement of the lance.

Several advantages are offered by the use of the present invention. Since the lance is prevented from penetrating into the battery compartment, the obstruction caused by it to the flow of electrolyte from the storage compartment into the battery cells is considerably reduced or even eliminated. Additionally, intercell leakage is substantially reduced by keeping the lance out of the battery compartment.

An object of the present invention is, therefore, to provide an improved activation mechanism for deferred-action batteries.

A further object of the present invention is to provide a means for rapid activation of such batteries, thus making it possible to maintain the battery in non-activated state until just prior to use.

These and other objects will become apparent to those skilled in the art of batteries upon examination of the following specification, claims, and the drawing.

BRIEF DESCRIPTION OF THE DRAWING

FIG. 1 is a vertical cross section of a deferred-action battery according to the present invention;

FIG. 2 illustrates a preferred embodiment of a lance for use in the embodiment of FIG. 1;

FIG. 3 is a fragmentary section of a view similar to FIG. 1 during a different stage of operation, when the battery is in process of activation; and FIG. 4 is a fragmentary section similar to FIG. 1, representing the battery after full activation.

DESCRIPTION OF THE PREFERRED EMBODIMENT

Referring now to FIG. 1 of the drawing, a reserve activated battery is shown having a housing with an external cylindrical shell 10. Shell 10 is constructed of material which is sufficiently strong to withstand the pressures generated inside the battery. A cover member 11 closes the upper end of the cylindrical shell 10. The bottom end of the shell is closed by a terminal plate 12 which carries the battery terminals and provide means for electrical connection from inside to the outside of the battery housing. A bulkhead 14 separates the cylindrical housing into two compartments, a battery compartment 15 and a liquid storage compartment 16. Bulkhead 14 has a central aperture 17, providing a passage between liquid storage compartment 16 and battery compartment 15. A diaphragm 18 is positioned within aperture 17 to close the passage until activation of the battery is desired. Diaphragm 18 is constructed of material such that it can be ruptured by piercing.

A compressible reservoir cup 20 is mounted within the liquid storage compartment 16. The cup is mounted with its open end against bulkhead 14, such that upon compression of cup 20, the only path open to the liquid flow is through passage 17 into battery compartment 15.

Mounted within reservoir cup 20, at a location opposite opening 17 and diaphragm 18, is a lance 21. Lance 21 has a pointed lower end facing diaphragm 18. The feature of the lance in the present invention is that it is "collapsible." It is constructed of three pieces of stainless steel wire 22, 23 and 24, welded together and forming the pointed end of the lance. At the other end, the three wires are welded to a disc 25 at three separate locations, providing a stable tripod configuration. At the pointed end of the lance and slightly above it, a cross-member 26, as more clearly visible from the illustration of FIG. 2, is welded. Cross member 26 is longer than the cross-section of opening 17 in bulkhead 14. The purpose of the cross-member is to prevent the penetration of the lance further into the battery compartment 15.

At the center of cover member 11 is located a gas generating assembly comprised of a chemical propellant or gas generator 30 held by a gas generator cup 31 threaded into cover member 11. A pair of lead wires 32 are brought into contact with chemical propellant 30 through a plastic plug 33.

Battery compartment 15 contains a plurality of battery cells shown at 40. The cells are arranged around a central column which is coaxial with the cylindrical shell 10 and which extends the entire height of battery compartment 15. The central column has a bore extending the entire length of battery compartment 15, from passage 17 in bulkhead 14 to terminal plate 12. A plurality of apertures 41 are provided from the central column into the individual cells of the battery. The liquid is thus allowed to flow from compartment 16 into cells 40 by means of the bore in the central column and apertures 41.

Terminal plate 12 carries positive and negative terminals 43 and 44. Cells 40 are arranged in a series configuration, forming a cell stack. Terminal 43 is connected by means of a conductor to the upper end of the cell stack, while terminal 44 is connected to the lower end of the cell stack.

Reservoir cup 20 is shown in the preferred embodiment as constructed in a form of a bellows. In this configuration, the cup can be easily compressed by application of force to the exterior of the cup. The reservoir cup could also take other forms, such as for example the deformable activator cup of the type shown in patent 3,239,385.

OPERATION

The operation of the invention can be most readily understood by referring to FIGS. 1, 3 and 4, illustrating the battery in different stages of activation. When activation is desired, a potential is applied to lead wires 32 of the gas generating assembly. The gas generating assembly can take many different forms. In this preferred embodiment there is utilized a moderate rate chemical propellant 30 activatable by an application of electric potential by means of a suitable source of electrical energy, not shown in the drawing, but connected to by means of lead wires 32. Upon application of electrical potential to chemical propellant 30, the propellant ignites and thereafter burns at a predetermined rate to generate a gas. The generation of the gas results in an increase in pressure within compartment 16, external to reservoir cup 20. Sufficient pressure is generated to compress cup 20 and force the sharp end of lance 21 downwardly through diaphragm 18. Diaphragm 18 is pierced by the sharp point of lance 21 and is then further ruptured by the increase in pressure within the fluid and by the flow of the liquid rushing through opening 17 into battery compartment 15. This is best shown by reference to FIGS. 3 and 4.

As cup 20 is further compressed by the expanding gas within compartment 16, lance 21 is forced further in the downward direction. However, due to cross-member 26, which prevents further penetration of the lance into the battery compartment, the further compression of cup 20 causes component wires of the lance to bend. The initial configuration of lance 21 is rigid enough to puncture the diaphragm, but as further movement brings the cross member to rest against the heavier walls of bulkhead 14, the wire members 22, 23 and 24 of lance 21 buckle. As cup 20 compresses further, lance 21 collapses completely in the manner shown in FIG. 4. The collapsing of lance 21 substantially removes the lance from interferring with the liquid flow into the battery compartment. Further, by preventing the penetration of the lance into the battery compartment, a potential intercell leakage path is eliminated.

While in the preferred embodiment the cup is shown as compressed by a gas generator type of activation force, other means such as fluid or mechanical, could clearly be used to achieve the purpose. Changes can be effected in detail of construction without departing from the spirit and scope of the invention as defined in and limited solely by the appended claims.

We claim:

1. In a deferred-action electrochemical battery having an activator section and a battery compartment separated from said activator section by a bulkhead with an aperture closed by a pierceable diaphragm, said activator section comprising:
   a compressible activator cup for containing liquid electrolyte mounted in said activator section, said cup having its open end sealed against said bulkhead and enclosing said diaphragm; and
   a deformable lance having a first end mounted within said cup at a position opposite its open end and having a pointed second end directed toward said diaphragm in said bulkhead;
   said lance further having an expanded portion at and slightly above the pointed end thereof, a cross sectional dimension of said expanded portion exceeding the diameter of said aperture closed by said diaphragm;
   whereby upon application of external force on said cup, said cup is compressed and said lance is forced to pierce said diaphragm and upon application of further force, said cup is further compressed, forcing the liquid electrolyte into said battery compartment, said expanded portion preventing said lance from penetrating further into said battery compartment.

2. Apparatus according to claim 1, wherein said activator cup is constructed in the form of a bellows.

3. Apparatus according to claim 1, wherein said deformable lance is comprised of three wires joined at one end to form a pointed end and mounted individually at the other end at separated points to thereby form a stable tripod arrangement.

4. Apparatus according to claim 1, wherein said deformable lance is comprised of a plurality of elongated members, joined at one end to form a pointed end and mounted individually at the other end to form a stable arrangement.

References Cited

UNITED STATES PATENTS 3,298,868　1/1967　Smith et al. _____ 136—114
3,236,697　2/1966　Amiet et al. _____ 136—62

ALLEN B. CURTIS, Primary Examiner

C. F. LeFEVOUR, Assistant Examiner

U.S. Cl. X.R.

136—90